United States Patent
Nayak et al.

(10) Patent No.: US 8,175,592 B2
(45) Date of Patent: May 8, 2012

(54) WIRELESS NETWORK SEARCH

(75) Inventors: Shivank Nayak, Indore (IN); Uttam Pattanayak, East Midnapore (IN)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 12/365,040

(22) Filed: Feb. 3, 2009

(65) Prior Publication Data

US 2010/0099399 A1  Apr. 22, 2010

Related U.S. Application Data

(60) Provisional application No. 61/106,696, filed on Oct. 20, 2008.

(51) Int. Cl.
*H04W 4/00* (2009.01)
(52) U.S. Cl. .................. 455/422.1; 455/432.1; 455/433; 455/445; 455/414.2; 455/435
(58) Field of Classification Search .............. 455/422.1, 455/433, 432.1, 411, 445, 414.2, 435.1
See application file for complete search history.

(56) References Cited

U.S. PATENT DOCUMENTS

| | | | |
|---|---|---|---|
| 6,871,069 B1 * | 3/2005 | Cho | 455/433 |
| 2002/0119774 A1 | 8/2002 | Johannesson et al. | |
| 2003/0133425 A1 * | 7/2003 | Radhakrishnan et al. | 370/335 |
| 2004/0236849 A1 | 11/2004 | Cooper et al. | |
| 2005/0107082 A1 | 5/2005 | Gunaratnam et al. | |
| 2006/0282554 A1 | 12/2006 | Jiang et al. | |
| 2007/0202875 A1 * | 8/2007 | Dorsey et al. | 455/434 |
| 2007/0298801 A1 | 12/2007 | Kim et al. | |

FOREIGN PATENT DOCUMENTS

| EP | 1096825 A1 * | 5/2001 |
|---|---|---|
| EP | 1858278 A1 | 11/2007 |

OTHER PUBLICATIONS

International Search Report and Written Opinion—PCT/US2009/037988-ISA/EPO—2009-07-06.

* cited by examiner

*Primary Examiner* — David Q Nguyen
(74) *Attorney, Agent, or Firm* — Kevin T. Cheatham

(57) ABSTRACT

A mobile communication device prior to establishing a communication session needs first to connect to a reachable network. To facilitate the search for the reachable network, the mobile communication device is preprogrammed intermediate parameters which lead to a plurality of reachable networks that are preselected based on a predetermined criterion.

20 Claims, 5 Drawing Sheets

| Country | MCC | Index | Bordening MCC Indices |
|---|---|---|---|
| A | 208 | 1 | 2, 3, 4 |
| B | 228 | 2 | 1, 3 |
| C | 222 | 3 | 1, 2, 4 |
| D | 262 | 4 | 1, 5, 3 |
| E | 269 | 5 | 4 |

FIG. 2

| Country | MCC-MNC Combination | MCC-MNC Combination Search Index | Bordering MCC Search Indices |
|---|---|---|---|
| A | 208 | 1 | 2, 3, 4 |
|   | 208-111 | 1a | 2, 3 |
|   | 208-222 | 1b | 4 |
| B | 228 | 2 | 1, 3 |
|   | 228-001 | 2a | 1, 3 |
| C | 222 | 3 | 1, 2, 4 |
|   | 222-222 | 3a | 1, 2 |
|   | 222-333 | 3b | 1 |
| D | 262 | 4 | 1, 5, 3 |
| E | 260 | 5 | 4 |
|   | 260-121 | 5a |  |

FIG. 3

| Country | MCC-BAND Combination | MCC-BAND Combination Search Index | Bordering MCC Search Indices |
|---|---|---|---|
| A | 208 | 1 | 2, 3, 4 |
|   | 208-BAND1 | 1a | 2, 3 |
|   | 208-BAND2 | 1b | 4 |
| B | 228 | 2 | 1, 3 |
|   | 228-BAND2 | 2a | 1, 3 |
| C | 222 | 3 | 1, 2, 4 |
|   | 222-BAND3 | 3a | 1, 2 |
|   | 222-BAND4 | 3b | 1 |
| D | 262 | 4 | 1, 5, 3 |
|   | 262-BAND1 | 4a | 1, 3 |
|   | 262-BAND5 | 4b | 5 |
| E | 260 | 5 | 4 |
|   | 260-BAND5 | 5a |   |

FIG. 5

WIRELESS NETWORK SEARCH

CLAIM OF PRIORITY UNDER 35 U.S.C. §119

The present application for patent claims priority to U.S. Provisional Application No. 61/106,696, entitled "Enhanced Public Land Mobile Network (PLMN) Search," filed on Oct. 20, 2008, and assigned to the assignee hereof and expressly incorporated by reference herein.

BACKGROUND

I. Field

The following disclosure concerns with communications, more particularly, relates to fast and efficient search of communication networks by user terminals.

II. Background

Wireless networks allow a user to engage in communications with others wherever the networks are deployed. Nevertheless, network accesses are generally localized. If the user with a mobile device attempts to engage in a communication session with another party, the mobile device needs first to access a reachable network. When the mobile device is within the geographical vicinity of the user's registered network, there may not be much difficulty in accessing the registered network. However, when the user roams in a foreign territory away from the registered network, network access may be problematic.

To begin with, networks available for access in the foreign territory may not be authorized to the user, if there are no prior agreements among the available networks and the user's registered network. Even with the available networks authorized for access, the mobile device needs first to search a reachable network. There are a vast number of networks available over a wide geographical extent. Without a systematic approach in searching the networks, the search can be time consuming, if at all possible. Over-the-air resources could have been more productively used instead of expended in random searching. Furthermore, such aimless searching also unnecessary drains the battery power of the user's mobile device. On the other hand, if total restriction on network searching is put in place while in the foreign territory, it may deny the user any network access.

Accordingly, there is a need to provide more efficient network searching schemes for better user experience, quality of service, and efficient use of communication resources.

SUMMARY

A mobile communication device prior to establishing a communication session needs first to connect to a reachable network. To facilitate the search for the reachable network, the mobile communication device is preprogrammed with an intermediate parameter which leads to a plurality of reachable networks. The reachable networks are preselected based on a predetermined criterion. The predetermined criterion can be the geographical contiguity of networks in the overall network layout, the use history of the networks by a user, or the user's own preference, to name just a few. As arranged, the search time can be substantially shortened. Furthermore, over-the-air resources and battery power of the mobile device can be more efficiently used.

These and other features and advantages will be apparent to those skilled in the art from the following detailed description, taken together with the accompanying drawings, in which like reference numerals refer to like parts.

BRIEF DESCRIPTION OF THE DRAWINGS

FIG. 2 is a table listing the relevant parameters of countries shown in FIG. 1;

FIG. 3 is a table listing the relevant parameters of countries shown in FIG. 1 in which each country is served by different networks;

FIG. 5 is a table listing the relevant parameters of countries shown in FIG. 1 in which each country is served by different networks operated under different assigned frequency bands.

DETAILED DESCRIPTION

Figure 1:
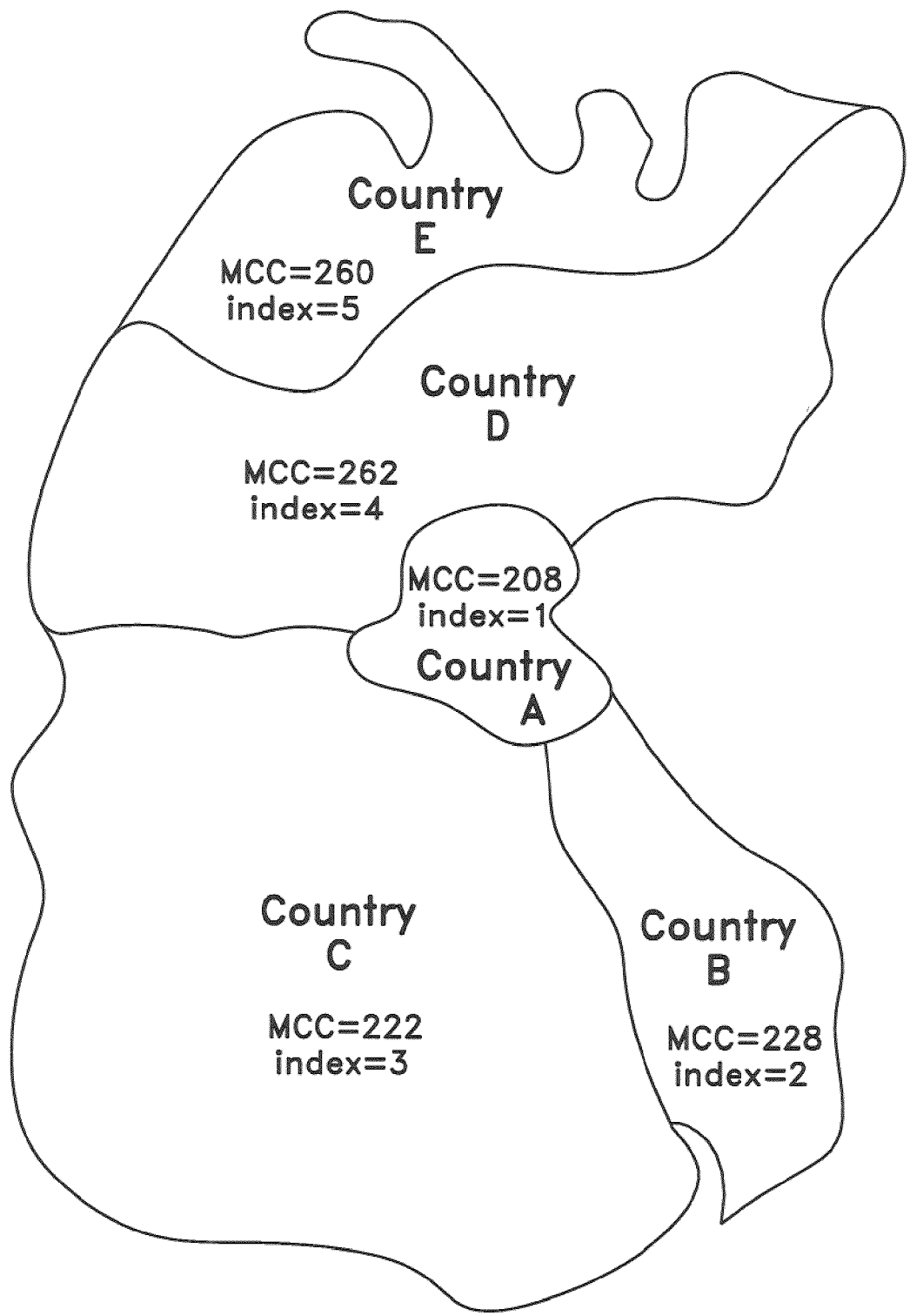
FIG. 1 shows a simplified geographical map of countries used in the illustration of a exemplary embodiment of the invention.

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the Wideband Code Division Multiple Access (WCDMA) and Global System for Mobile Communication (GSM) standards, as promulgated under the $3^{rd}$ Generation Partnership Project (3GPP) by the International Telecommunication Union (ITU) is used. The WCDMA/GSM standards are sometimes called the Universal Mobile Telecommunications System (UMTS) standards. It should be emphasized that the invention is also applicable to other technologies, such as technologies and the associated standards related to Code Division Multiple Access (CDMA), Time Division Multiple Access (TDMA). Orthogonal Frequency Division Multiple Access (OFDMA), and so forth. Terminologies associated with different technologies can vary. For example, depending on the technology considered, the User Equipment (UE) used in the WCDMA standards can sometimes be called a mobile station, a user terminal, a subscriber unit, a terminal equipment, etc., to name just a few. Likewise, the Access Node (AN) used in the WCDMA standards can sometimes be called an access point, a base station, a Node B, and so forth. It should be noted here that different terminologies apply to different technologies when applicable.

Network accesses are generally localized. For example, in a UMTS network, if the user of a UE tries to engage in a communication session, be it with another UE or with a server, the UE needs first to access a reachable network. The reachable network in the first place may not be the most preferred network that the UE should acquire. An example of such a scenario is when the UE is roaming in a foreign territory.

Heretofore, searching for a reachable network has been relatively difficult, time-consuming and sometimes even not possible.

Returning to the example as mentioned above, according to the current scheme (e.g., see 3GPP specification, TS23.122), when the UE which is registered on a less preferred Public Land Mobile Network (PLMN) and is roaming, the UE must search for higher preferred PLMNs periodically. In a UMTS network, preference order of PLMNs is specified in preferred PLMN lists stored in Subscriber Identity Module (e.g., see the SIM, 3GPP specification TS31.102). The preference order can be defined by the operator and user. A mobile station may store the order lists in some other medium in a different manner as per the corresponding protocol specifications.

The periodicity of search can be 2 minutes or 6 minutes or multiples thereof. In the search, the UE is limited to search for the PLMNs of the same Mobile Country Code (MCC), that is, the MCC of the country where the UE currently registered. Problems may arise if the UE roams in a foreign country or at the boundary of the foreign country and the home country. Among other things, the UE may be confined to a limited search, e.g., limited to the PLMNs of the same MCC as currently registered by the UE. Consequently, the UE may not be able to get service on a higher preferred PLMN or a home PLMN, even though it is available at that location. To avoid such problems, the restriction of limiting the UE to search for PLMNs of only the UE's designated MCC can be lifted. Nevertheless, the UE needs then to search for many MCCs, wherein each MCC in turn encompasses many PLMNs. Such a search is time consuming and further an inefficient use of communication resources.

In a first exemplary embodiment described below, the UE maintains a small mapping data base which has the MCC of the UE's currently camped country and also the MCCs of the UE's neighboring countries.

To facilitate the search and to streamline memory storage, each MCC can be assigned an index. In this example, the index serves as an intermediate parameter linking the MCC of the UE's registered country and the searchable networks.

Reference is directed to FIG. 1. Suppose the UE initially registered with Country C having an assigned MCC of 222. Further suppose Country C has Countries A, B and D as its contagious neighbors, as shown in FIG. 1.

FIG. 2 is a table listing Countries A-C with their respective indices. Furthermore, the table of FIG. 2 shows the indices of the neighboring countries of each country. As in this case, the user of the UE initially registered with Country C. Further suppose the home country of the UE's user is Country A. Country C is assigned an index of 3. The contagious countries with Country C are Countries A, B and D (FIG. 1), which in turn are assigned indices 1, 2 and 4, respectively (FIG. 2). In such a UE, for purpose of PLMN searching according to this embodiment, the MCCs corresponding to the indices 1, 2 and 4 can be programmed. More specifically, the MCCs 208, 228 and 262 can be programmed into the memory of the UE. The MCCs 208, 228 and 262 are in turn pointed by the indices 1, 2 and 4, respectively. Thus, when the UE is in Country C with a MCC 222 which is a lower preferred PLMN, the UE periodically tries to search for the home country or other higher preferred PLMNs. For higher preferred PLMNs, the UE can start searching by referring to the index 3, i.e., searching in the current Country C. The search may then lead to searching of PLMNs of bordering countries referred by index 1, 2 and 4 pointing to Countries A, B and D, respectively. Phrased differently, the search leads to searching of PLMNs with MCCs 208, 228, 262, after searching the MCC 222 of the UE's Home Country. As such, the UE geographically located near the boundary of Country C may be able to acquire service on a higher preferred PLMN of neighboring country, such as Country A, B or D.

Simply put, in accordance with the searching scheme above, when the UE travels out of Country C with the MCC of 222, the UE can start searching for PLMNs by first referring to the indices 1, 2 and 4, which in turn lead to searching of PLMNs with the MCCs 208, 228 and 262, respectively.

It should be noted that the scheme and priority of searching need not be based on geographical contiguity as in the example above. The search can be very well be designed based on other criteria on a predetermined layout of networks. For example, instead of programming the search based on country contiguity as in the exemplary embodiment, it is feasible that the criteria can be based on the history and/or frequency of visit of countries of the UE's user.

In the above embodiment, it is assumed that the UE searches the PLMNs only via MCCs. However, each country with an assigned MCC can have more than one network serving the country. A more populated country may have more networks, and vice versa.

FIG. 3 shows an example in which a table is listed with different countries served by different networks.

Returning to the example described previously, suppose Country B with the MCC 228 is a sparsely populated country and has only one network with a Mobile Network Code (MNC) 001 assigned. As for Country A with the MCC 208, it is relatively more populated and has two networks with MNCs 111 and 222. Likewise for Country C which has MNCs 222 and 333 assigned. A unique index can be assigned to each MCC-MNC combination, as shown in FIG. 3.

For instance, the same UE originally registered to the network with a MNC 222 in Country C having an assigned MCC of 222. The 222-222 MCC-MNC combination can be assigned an index of 3a. Further suppose the neighboring countries for the MCC-MNC combination 222-222 are Countries A and B, but not D. Such a scenario can occur if the network with the MNC 222 is far away from Country D. In such a case, the UE can be programmed to start the search with the index 3a, follows with the index 1 and then the index 2, corresponding to the Countries C, A and B, respectively. That is, when the UE originally registered with a MCC-MNC combination of 222-222 and is currently in Country C, in accordance with the exemplary embodiment, the search starts with reference to index 3a. If no suitable PLMN can be found, the UE is pointed to the indices of the bordering MCCs 1 and 2 (FIG. 3).

As a safeguard, a provision can be put in place in which the UE is registered in a MCC-MNC combination. Nevertheless, the registered MCC-MNC combination is not programmed in the UE. Such a scenario can occur when the network which the UE registered is newly installed and the UE has not updated its stored programmed information. For illustration, suppose the UE is originally registered with a MCC-MNC combination of 222-234, which should be but somehow not programmed in the index table of the UE. The user of the UE wishes to establish a communication connection with a higher preferred PLMN by searching for higher preferred PLMNs of Country C and all bordering countries. The search again can be set up and made possible with only the MCC information and without the MNC information. In this case, the search starts by first referring to the index 3 (FIG. 3), the index which is assigned to Country C where the UE originally registered. If no suitable PLMN can be found, the UE continues with the search by referring to indices 1, 2 and 4, as shown in FIG. 3.

It is possible that a MCC-MNC combination has no bordering PLMN programmed in the UE. An example is as shown in FIG. 3 which the MCC-MNC combination 260-121. This scenario can occur when the network with the MNC 121 is located at the very remote part of Country E, for instance. In this case, the UE can only refer to the index 5a for higher preferred PLMNSs of Country E and not other indices.

Figure 4:
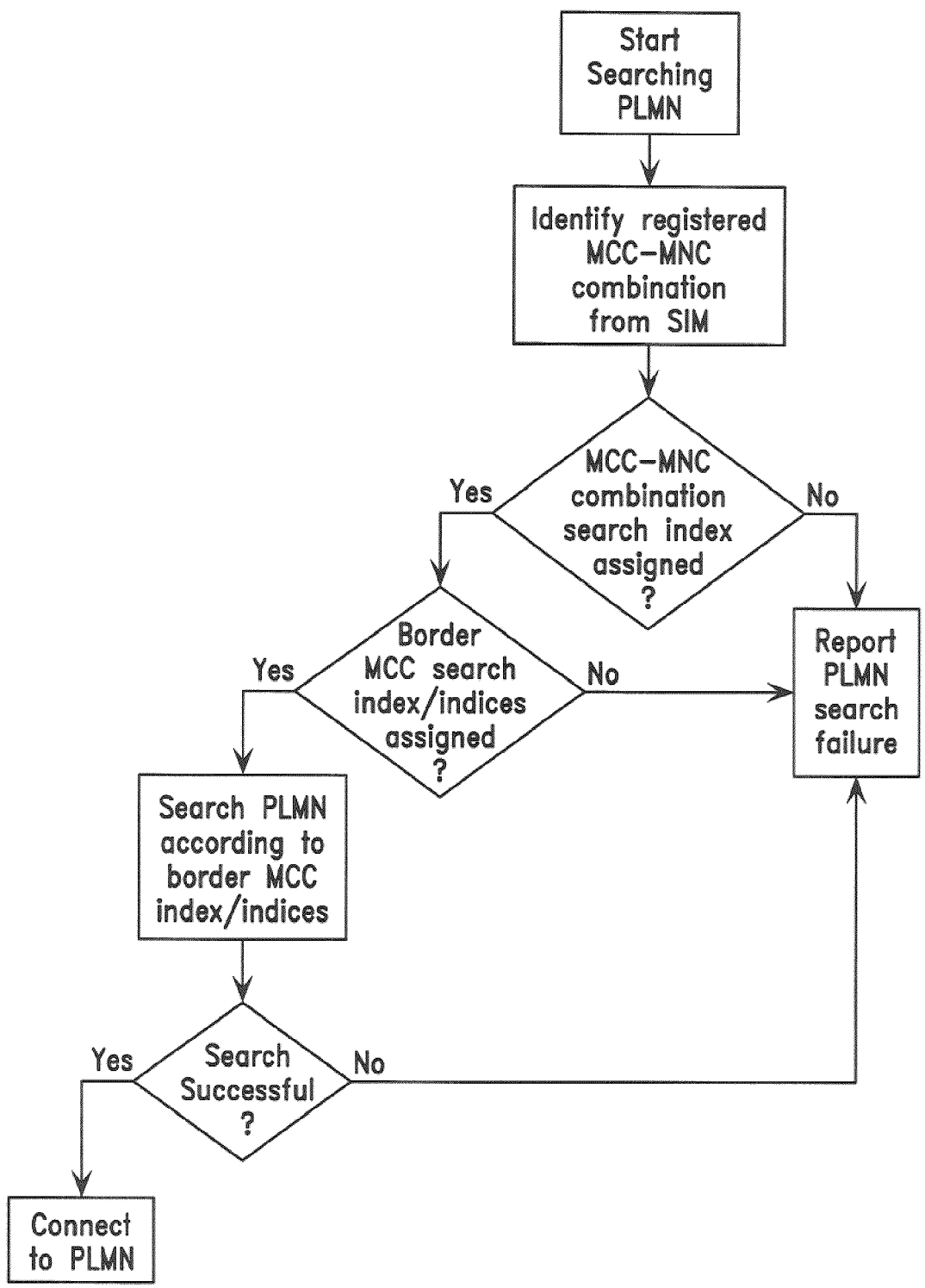
FIG. 4 is a flowchart illustrating the steps involved in the network searching of the exemplified embodiment.

FIG. 4 summarizes the exemplary search process as described above.

In yet another embodiment, a higher level of definition can further be made. For example, each MNC can further be divided into regions with different Location Area Code (LAC). In that case, instead of the indices corresponding to the MCC-MNC combinations, the indices can be programmed to correspond to the MCC-MNC-LAC combinations. For the sake of clarity and brevity, the embodiment with the MCC-MNC-LAC combinations are substantially similar as that described above and is not further elaborated.

In the above embodiments as described, the search is based on MCC-MNC or the MCC-MNC-LAC combinations. As an alternative, the search can be based on MCC-BAND combinations, where "BAND" is the operating frequency band assigned to the network.

Different networks serve different countries. Very often, in each country, there is a regulatory authority with allocates certain frequency bands to the different networks. As such, network operators operate their networks with the assigned frequency bands, so as not to interfere with other networks.

FIG. 5 shows an example in which a table is listed with different countries severed by different networks operated under different assigned frequency bands. Since there is a one-to-one correspondence between each frequency band and a network, the MNCs need not be programmed into the UE, as shown in the table of FIG. 5.

It should be noted that the frequency bands can be reused, for example, if the distance between two networks operating under the same frequency band is far enough. For instance, referring to FIG. 5, the frequency band BAND2 is deployed to serve both Countries A and B. Such arrangement can be made possible if the network operating under BAND2 in Country A is geographically far enough from the counterpart network operating under BAND2 in Country B.

Searching via the MCC-BAND combinations is substantially similar to searching via the MCC-MNC combinations. For the sake of brevity and clarity, Searching via the MCC-BAND combinations is not further repeated.

Figure 6:
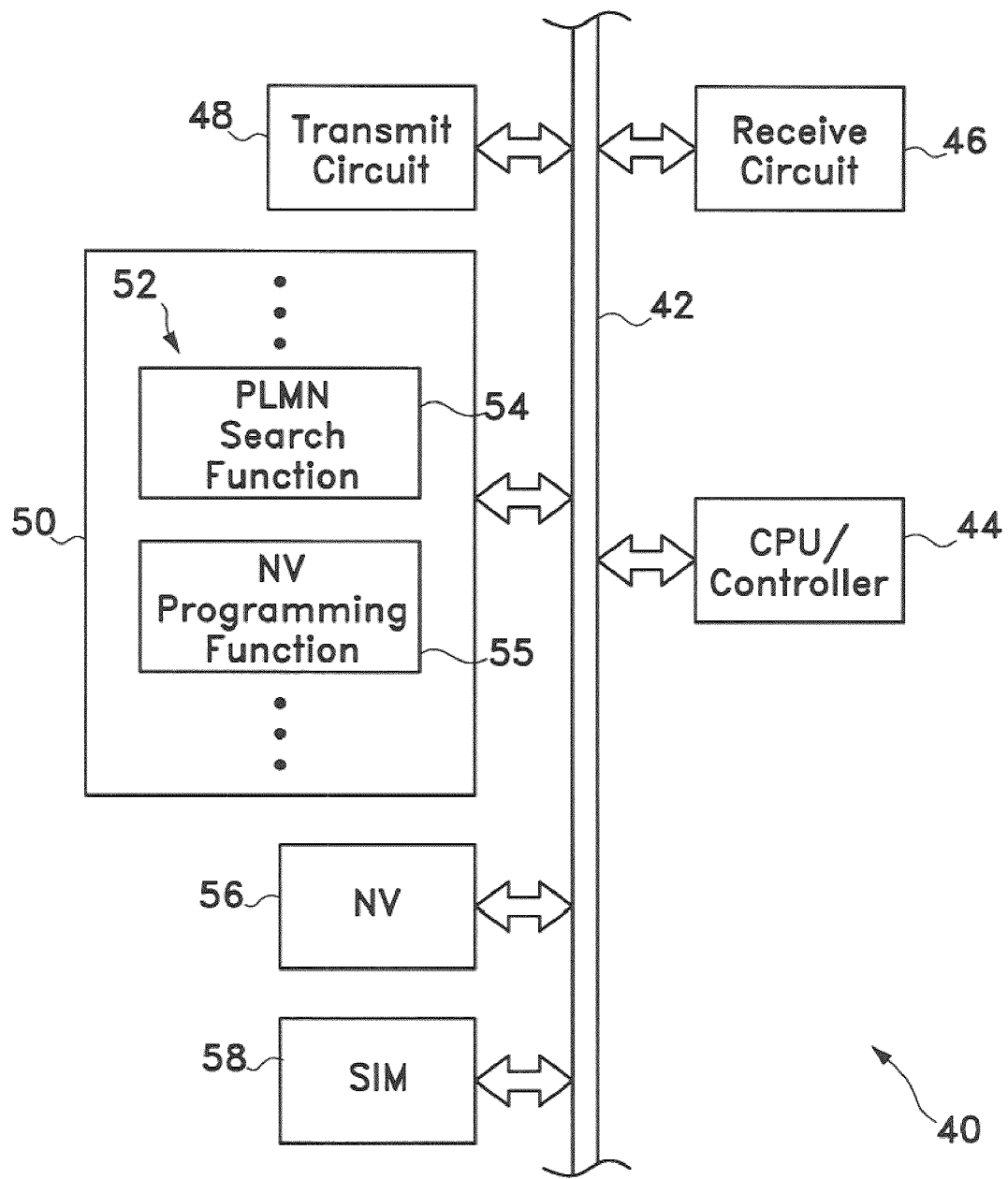
FIG. 6 is a schematic drawing of a part of the circuitry of an apparatus used in the network searching of the exemplary embodiment.

FIG. 6 shows the part of hardware implementation of an apparatus for executing the network searching processes as described above. The circuit apparatus is signified by the reference numeral 40 and can be implemented in the UE and other communication entities, such as any entity communicating with the UE. For instance, the circuit apparatus 40 can be installed in an AN wherein after processing through the circuit 40, PLMN search results can be sent to the UE.

The apparatus 40 comprises a central data bus 42 linking several circuits together. The circuits include a CPU (Central Processing Unit) or a controller 44, a receive circuit 46, a transmit circuit 48, and a memory unit 50.

If the apparatus 40 is part of a wireless device, the receive and transmit circuits 46 and 48 can be connected to a RF (Radio Frequency) circuit but is not shown in the drawing. The receive circuit 46 processes and buffers received signals before sending out to the data bus 42. On the other hand, the transmit circuit 48 processes and buffers the data from the data bus 42 before sending out of the device 40. The CPU/controller 44 performs the function of data management of the data bus 42 and further the function of general data processing, including executing the instructional contents of the memory unit 50.

The memory unit 50 includes a set of modules and/or instructions generally signified by the reference numeral 52. In this embodiment, the modules/instructions 52 include, among other things, a PLMN search function 54, and a Non-Volatile (NV) programming function 55. The functions 54 and 55 includes computer instructions or code for executing the process steps as shown and described in FIGS. 1-5. Specific instructions particular to an entity can be selectively implemented in function 54. For instance, if the apparatus 40 is part of a UE, among other things, instructions particular to the process steps of the UE as shown and described in FIG. 1-5 can be coded in the functions 54 and 55. Similarly, if the apparatus 40 is part of a communication entity, for example an AN, process steps particular to that communication entity can be coded in the function 54, and function 55 can be dispensed with.

In addition to the memory 50, in this embodiment, there are other storage units included in the circuit apparatus 40. Specifically, there is a Non-Volatile (NV) memory unit 56 linked to the data bus 42. Furthermore, there is a Subscriber Identity Module (SIM) connected to the data bus 58. The NV unit 56 can store the mapping table and the indexing table as described previously. The NV 56 unit can be made programmable by the operator, or by the user with or without authorization from the operator. If the NV unit 56 is designed to be programmable by the operator, data for programming the NV unit 56 can be sent Over-the-Air (OTA), for instance. The SIM 58 other than storing the identity information as a subscribing UE, can also be programmed to store the mapping and index tables as aforementioned. In that case, the NV unit 56 and the SIM 55 can be merged as one entity.

If the memory unit 50 is of the nonvolatile type, the NV unit 56 and the memory unit 50 can certainly be merged together.

In this embodiment, the memory unit 50 is a RAM (Random Access Memory) circuit. The exemplary functions, such as the functions 54 and 55, are software routines, modules and/or data sets. As mentioned earlier, the memory unit 50 can be tied to another memory circuit, such as the NV unit 56 and the SIM 58, which can either be of the volatile or nonvolatile type. As an alternative, the memory unit 50 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 44 shown and described in the drawing figure of FIG. 6, for execution. Such a medium can be of the storage type and may take the form of a volatile or nonvolatile storage medium as also described previously, for example, in the description of the memory unit 50 in FIG. 6. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 40.

Finally, other changes are possible within the scope of the invention. Other than as described above, any other logical blocks, circuits, and algorithm steps described in connection with the embodiments can be implemented in hardware, software, firmware, or combinations thereof. It will be understood by those skilled in the art that theses and other changes in form and detail may be made therein without departing from the scope and spirit of the invention.

What is claimed is:

1. A method of searching for a reachable network for communications, comprising:
providing a reference network;
providing an intermediate parameter leading to a plurality of preselected reachable networks, wherein the intermediate parameter is provided as an index that links a location and the reachable networks, and wherein the index corresponds to a specific combination of a Mobile Country Code (MCC) and a Mobile Network Code (MNC);
associating the intermediate parameter with the reference network; and
searching the reachable networks via the intermediate parameter.

2. The method as in claim 1 further comprising associating the intermediate parameter with the reachable networks based on a predetermined criterion.

3. The method as in claim 2 further comprising considering the overall network layout in determining the predetermined criterion.

4. The method as in claim 3 further comprising considering the geographical contiguity of the countries in the overall network layout in determining the predetermined criterion.

5. The method as in claim 3 further comprising considering the use history of the networks in the overall network layout as the predetermined criterion.

6. The method as in claim 3 further comprising considering a user's preference of the networks in the overall network layout as the predetermined criterion.

7. An apparatus for communications, comprising:
means for providing a reference network;
means for providing an intermediate parameter leading to a plurality of preselected reachable networks, wherein the intermediate parameter is provided as an index that links a location and the reachable networks, and wherein the index corresponds to a specific combination of a Mobile Country Code (MCC) and a Mobile Network Code (MNC);
means for associating the intermediate parameter with the reference network; and
means for searching the reachable networks via the intermediate parameter.

8. The apparatus as in claim 7 further comprising means for associating the intermediate parameter with the reachable networks based on a predetermined criterion.

9. The apparatus as in claim 8 further comprising means for considering the overall network layout in determining the predetermined criterion.

10. The apparatus as in claim 9 further comprising means for considering the geographical contiguity of the countries in the overall network layout in determining the predetermined criterion.

11. The apparatus as in claim 9 further comprising means for considering the use history of the networks in the overall network layout as the predetermined criterion.

12. The apparatus as in claim 9 further comprising means for considering a user's preference of the networks in the overall network layout as the predetermined criterion.

13. An apparatus for communications, comprising:
circuitry configured to:
provide a reference network;
provide an intermediate parameter leading to a plurality of preselected reachable networks, wherein the intermediate parameter is provided as an index that links a location and the reachable networks, and wherein the index corresponds to a specific combination of a Mobile Country Code (MCC) and a Mobile Network Code (MNC);
associate the intermediate parameter with the reference network; and
search the reachable networks via the intermediate parameter.

14. The apparatus as in claim 13 wherein the circuitry is further configured to associate the intermediate parameter with the reachable networks based on a predetermined criterion.

15. The apparatus as in claim 14 wherein the circuitry is further configured to consider the overall network layout in determining the predetermined criterion.

16. The apparatus as in claim 15 wherein the circuitry is further configured to consider the geographical contiguity of the countries in the overall network layout in determining the predetermined criterion.

17. The apparatus as in claim 15 wherein the circuitry is further configured to consider the use history of the networks in the overall network layout as the predetermined criterion.

18. The apparatus as in claim 15 wherein the circuitry is further configured to consider a user's preference of the networks in the overall network layout as the predetermined criterion.

19. A computer program product, comprising:
a computer-readable medium physically embodied with computer-readable code for:
providing a reference network;
providing an intermediate parameter leading to a plurality of preselected reachable networks, wherein the intermediate parameter is provided as an index that links a location and the reachable networks, and wherein the index corresponds to a specific combination of a Mobile Country Code (MCC) and a Mobile Network Code (MNC);
associating the intermediate parameter with the reference network; and
searching the reachable networks via the intermediate parameter.

20. The computer program product as in claim 19 wherein the computer-readable medium further comprising computer-readable program code for associating the intermediate parameter with the reachable networks based on a predetermined criterion.

* * * * *